J. H. COBB & G. T. FLEMING.
DEVICE FOR LOADING TRAVELER HOLDERS.
APPLICATION FILED APR. 10, 1909.

948,161.    Patented Feb. 1, 1910.

Witnesses
Jos. H. Blackwood
W. C. Blackwood

Inventors.
James H. Cobb
George T. Fleming
By James K. Polk
Attorney

UNITED STATES PATENT OFFICE.

JAMES H. COBB AND GEORGE T. FLEMING, OF BELTON, SOUTH CAROLINA, ASSIGNORS TO EDWARD S. TENNENT, OF SPARTANBURG, SOUTH CAROLINA.

DEVICE FOR LOADING TRAVELER-HOLDERS.

948,161. Specification of Letters Patent. Patented Feb. 1, 1910.

Application filed April 10, 1909. Serial No. 489,139.

*To all whom it may concern:*

Be it known that we, JAMES H. COBB and GEORGE T. FLEMING, citizens of the United States, and residents of Belton, in the county of Anderson and State of South Carolina, have invented certain new and useful Improvements in Devices for Loading Traveler-Holders, of which the following is a specification.

Our invention relates to devices for loading the traveler-holders shown, described, and claimed in an application field March 9, 1909, and given Serial No 482,367, and consists of a bar shaped to receive the travelers and having one end formed pointed to engage a socket in the top of the holder when constructed in that manner while its other end is constructed with a V-shaped notch and socket to receive the pointed end of the holders when constructed in that manner.

The invention will be described in detail hereinafter and illustrated in the accompanying drawings, in which—

Figure 2:
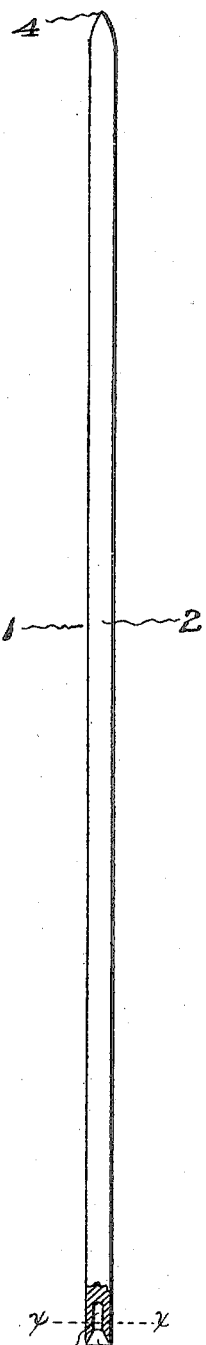
Figure 3:
Figure 1:

Figure 1 is a side view of the loading-device; Fig. 2, a plan view, showing one end in section; Fig. 3, a cross-section with a traveler in position; and Fig. 4, a fragmental view of the traveler-holder referred to above with which our loading device is used.

In the drawings similar reference characters indicate corresponding parts in the several views.

The loading device consists of a bar 1 of rigid material having one side 2 flat and the other side curved, as shown at 3, to receive and temporarily hold the travelers A, consisting of U-shaped bands of metal, having inwardly-extending prongs *a*, the travelers being placed on the bar 1 by inserting the pointed end 4, so that the U-shaped portion engages the curved side 3 and the prongs *a* engage the flat side 2. As stated, one end of the bar is formed pointed, as shown at 4, while the other end is formed with a V-shaped notch 5 and a socket 6, extending longitudinally of the bar from the apex of said notch.

Figure 4:
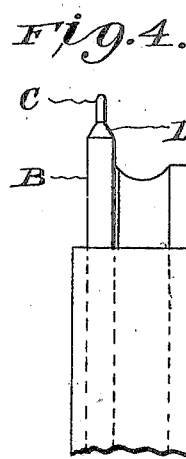

In Fig. 4 is shown the top fragment of a holding device B with its end pointed, as shown at C, and having a tapering shoulder D to engage the V-shaped notch 5 and socket 6.

When in use the travelers are placed on the bar 1, in the position stated, the flat and rounded sides insuring that they be uniformly installed, so that they may be collectively slipped off of the bar onto the holder shown in Fig. 4, so that when used for loading the holder the pointed end fits into the socket on the top of the holder when it is constructed with a socket. The travelers may be easily and quickly removed from the bar to the holder, or when the holder may be formed with a pointed upper end the socket 6 is fitted over said end, the V-shaped notch 5, extending down the tapered portion of the end of the holder, makes a practically continuous surface, and the travelers can be slipped off of the rod without trouble.

Having thus described our invention, what we claim is—

1. As an article of manufacture, a loading device for traveler-holders comprising a rod having a V-shaped notch in one end, and a socket extending longitudinally of the rod from the apex of said notch, substantially as shown and described.

2. As an article of manufacture, a loading device for traveler-holders comprising a rod having a flat side, a curved surface connecting the edges of said flat side, a V-shaped notch in one end, and a socket extending longitudinally of the rod from the apex of said notch, substantially as shown and described.

3. As an article of manufacture, a loading device for traveler-holders comprising a rod having one end pointed and the other end formed with a V-shaped notch, and a socket extending longitudinally of the rod from the apex of said notch, substantially as shown and described.

4. As an article of manufacture, a loading device for traveler-holders comprising a rod having a flat side, a curved surface connecting the edges of the said flat side, one end of said rod being pointed, the other end formed with a V-shaped notch cutting said flat side, and a socket extending longitudinally of the rod from the apex of said notch, substantially as shown and described.

In witness whereof, we have hereunto set our hands in presence of two subscribing witnesses.

JAMES H. COBB.
GEORGE T. FLEMING.

Witnesses:
LEROY A. WERTS,
A. K. GRIFFIN.